United States Patent

King, Jr.

[15] 3,649,129
[45] Mar. 14, 1972

[54] TORQUE RESETABLE OVERLOAD RELEASING CLUTCH FOR TOOL HOLDERS AND THE LIKE

[72] Inventor: John L. King, Jr., Frankenmuth, Mich.
[73] Assignee: Houdaille Industries, Inc., Buffalo, N.Y.
[22] Filed: Jan. 19, 1970
[21] Appl. No.: 3,845

[52] U.S. Cl. .............................408/139, 10/89 H, 10/135, 10/141 H
[51] Int. Cl. .................B23g 1/00, B23g 1/16, B23g 1/18
[58] Field of Search .............10/89, 89 H, 129, 135, 141 H; 408/139, 140, 231, 238, 239

[56] References Cited

UNITED STATES PATENTS

| 1,748,511 | 2/1930 | Johnson | 10/135 |
|---|---|---|---|
| 2,391,438 | 12/1945 | Muir | 10/135 |
| 3,134,997 | 6/1964 | Walker | 10/135 |
| 3,521,314 | 7/1970 | Steiner | 10/135 |
| 1,681,288 | 8/1928 | Galloway | 408/139 |
| 2,684,491 | 7/1954 | Roddick | 408/139 |
| 3,002,206 | 10/1961 | Johnson | 408/139 |

FOREIGN PATENTS OR APPLICATIONS

| 28,654 | 12/1909 | Great Britain | 10/135 |
|---|---|---|---|
| 128,515 | 11/1928 | Switzerland | 10/135 |
| 555,056 | 8/1922 | France | 10/141 |
| 576,613 | 5/1959 | Canada | 10/135 |
| 703,027 | 1/1954 | Great Britain | 10/135 |
| 916,615 | 8/1954 | Germany | 10/135 |

*Primary Examiner*—Charles W. Lanham
*Assistant Examiner*—E. M. Combs
*Attorney*—Hill, Sherman, Meroni, Gross & Simpson

[57] ABSTRACT

Apparatus such as a tool driver liable to excessive torque in operation comprises first and second portions in concentric relatively rotatable assembly having respective confronting relative rotatably movable areas or races with at least one wedgingly coactive roller clutch element normally biased to effect corotation of the portions in response to rotary movement of one of the portions, and torque-sensitive over-load releasing means operative in response to torque resistance including a friction clutch connecting one of said areas to its portion of the apparatus and means on the same portion of the apparatus operative when the friction clutch slips due to overload torque resistance to release said roller clutch element to permit one of said portions to rotate relative to the other of said portions.

13 Claims, 7 Drawing Figures

Patented March 14, 1972
3,649,129
2 Sheets-Sheet 1
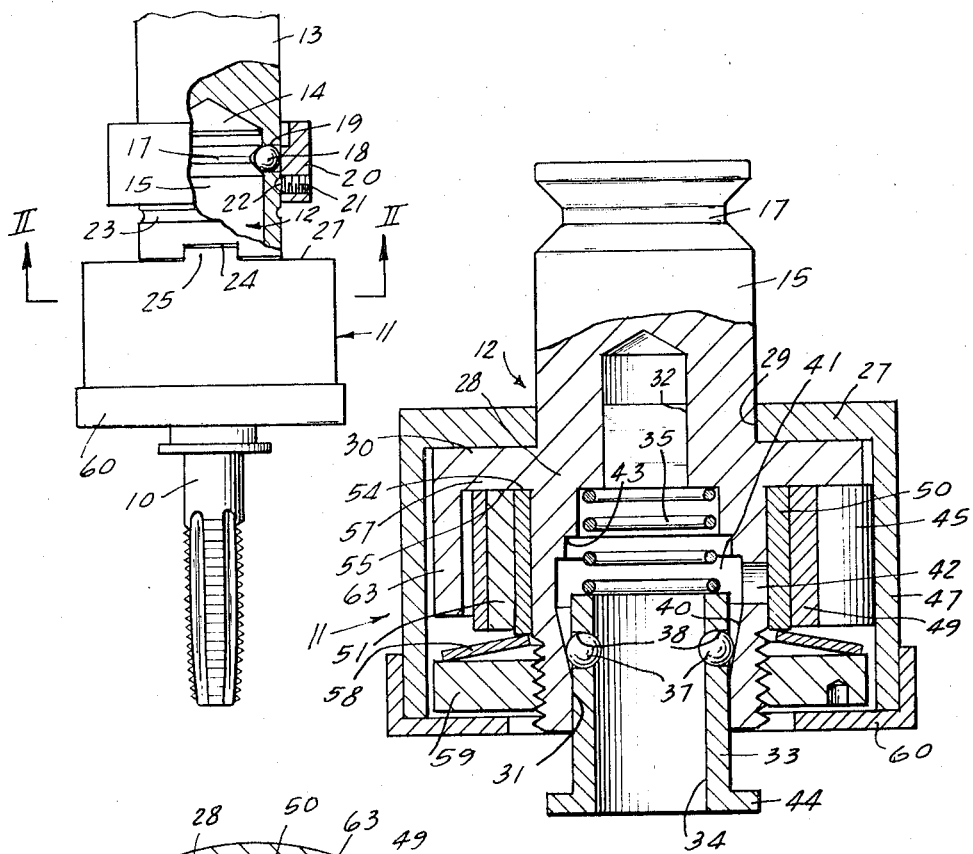
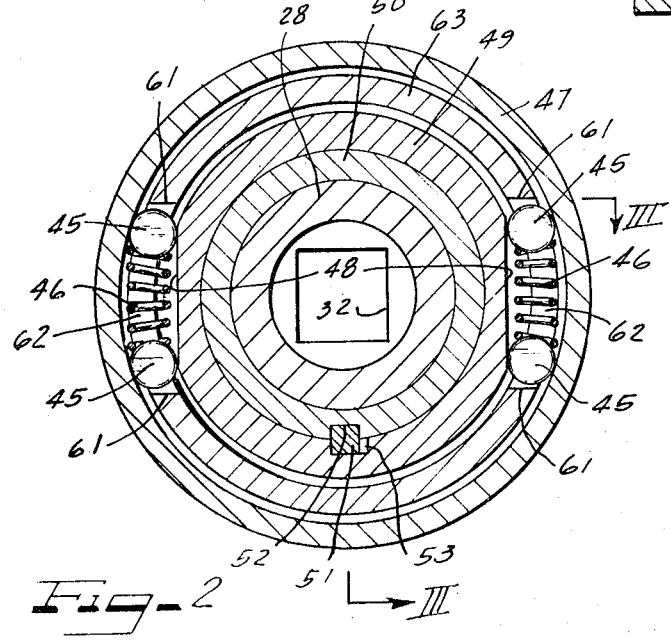
INVENTOR.
JOHN L. KING, JR.
BY Hill, Sherman, Meroni, Gross & Simpson
ATTORNEYS

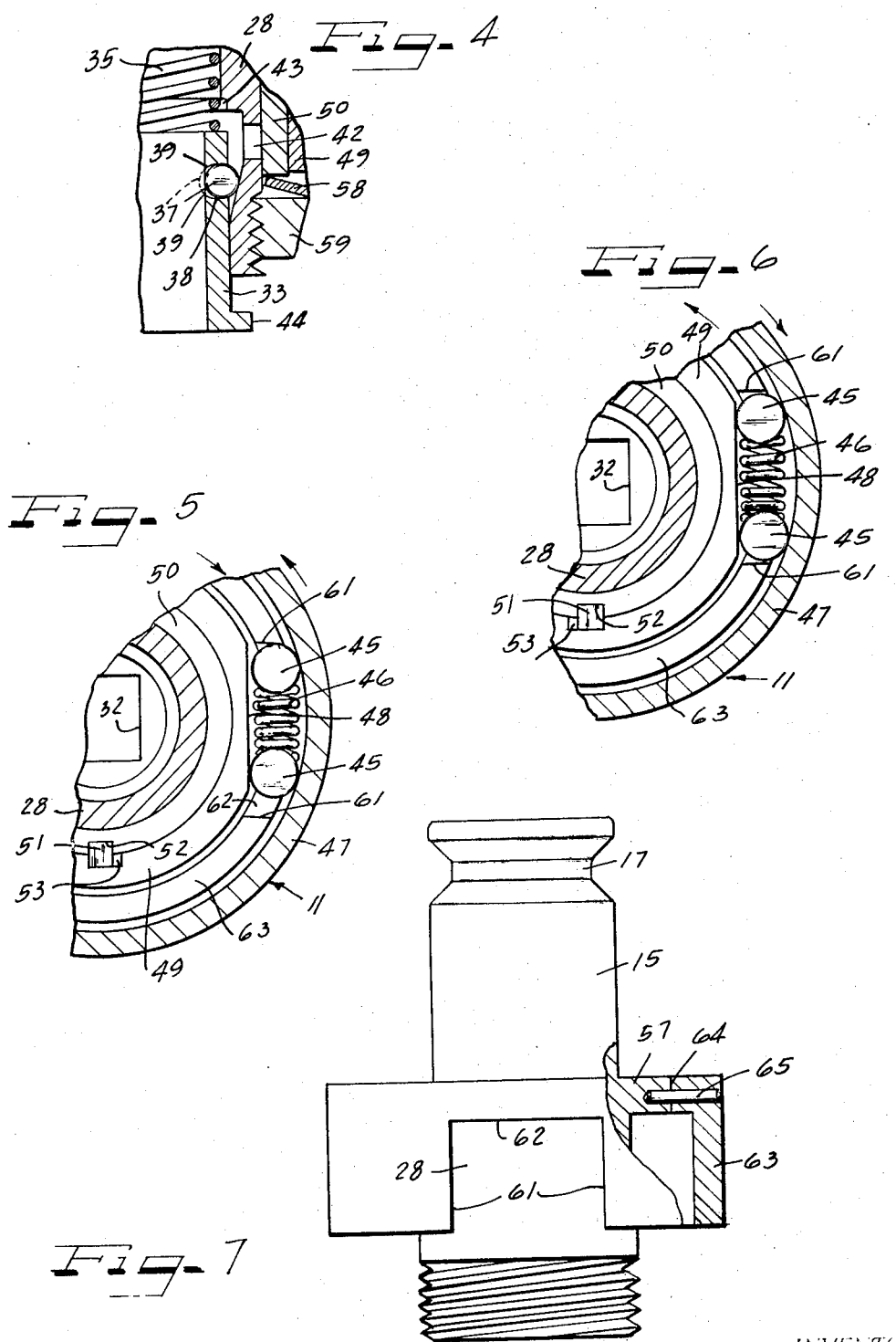

TORQUE RESETABLE OVERLOAD RELEASING CLUTCH FOR TOOL HOLDERS AND THE LIKE

This invention relates to torque resetable overload releasing clutch structure and is more particularly concerned with overload release means for tool holders such as tap chucks.

In various apparatus, of which power tool holders such as tap chucks are representative, excessive torque during operation may result in breakage or damage in respect to a tool, the holder, the driving machine, the workpiece, and the like. In machining operations, for example, it frequently occurs that the torque load on the tool exceeds the normal level, and may increase to the point of damage to the tool or workpiece. With particular reference to tapping operations, such torque overloads may be the result of "bottoming out" of the tap, a dull tap, lack of lubrication, a hard spot in the workpiece, or other causes.

Accordingly, it is an important object of the present invention to provide new and improved means for automatically releasing rotary apparatus from torque overload at a predetermined level, and which will automatically reset itself upon reversing the direction of rotation.

Another torque-sensitive of the invention is to provide new and improved tor!que-sensitive release means for roller clutches.

A further object of the invention is to provide a new and improved automatic torque-sensitive clutch structure.

Still another object of the invention is to provide a new and improved torque-sensitive releasing device especially suitable for tool holders such as taps chucks.

Yet another object of the invention is to provide a new and improved tool chuck having simple and efficient, positively acting, automatically overload torque releasable ad automatically resetable clutch mechanism.

A yet further object is to provide a new and improved chuck device.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 1 is a side elevational view, partially in section, showing a typical tool holder, such as for operatively carrying a tap, embodying features of the invention;

FIG. 2 is an enlarged transverse sectional detail view taken substantially along the line II—II of FIG. 1;

FIG. 3 is a vertical sectional detail view taken substantially along the irregular section line III—III of FIG. 2;

FIG. 4 is a fragmentary sectional detail view similar to FIG. 3 but showing certain parts in a relatively shifted relationship;

FIG. 5 is a fragmentary sectional view similar to FIG. 2 but showing the roller clutch released;

FIG. 6 is a sectional view similar to FIG. 5 but showing the relationship when the roller clutch is reset; and FIG. 7 is a sectional elevational view of the tool carrying body member and showing a slight modification.

In the representative embodiment of the invention illustrated, a tool holder such as a chuck for operatively supporting a tap 10 (FIG. 1) comprises a first or driving portion 11 and a second or driven portion 12. In this instance, the driving portion 11 is in the form of a generally inverted cup-shaped member which provides a housing within which the second portion 12 is mounted. On the other hand, the second portion 12 is constructed and arranged to enable connection of the chuck to a suitable driver or spindle terminating in a nose portion 13 having an axially outwardly opening tool-receiving socket 14 within which is slidably received a shank 15 of the driven portion 12 provided with a head end annular radially outwardly opening groove 17 in which locking means in the form of one or more balls 18 in respective radial holes or sockets in the wall defining the tool socket 14 are engageable lockingly as held by a locking collar 20 longitudinally slidably mounted about the spindle nose 13 and releasably retained as by means of a set screw 21 engageable in an outer peripheral set screw groove 22 in the spindle nose and from which the set screw may be released to drop the locking collar into ball unlocking position and in which position the collar may be held against dropping from the spindle nose by engaging the set screw in a retaining groove 23 is spaced from the groove 22. Through this arrangement, the tool chuck is readily mounted on or removed from the driving spindle, but the locking balls 18 enable the shank 15 to rotate relative to the spindle nose 13 when necessary while maintaining the chuck against axial displacement from the spindle nose.

Driving of the tool chuck by the spindle nose 13 is effected by means of a driving coupling between the driving member 11 and the spindle nose. For this purpose, driving means are provided which are automatically interconnected and remain interconnected as an incident to inserting and locking the shank 15 in the spindle nose, and comprising one or more notches 24 opening from the tip of the nose 13 and within which are engageable complementary interlock lugs 25 on the outer side of an end wall 27 of the member 11. Other desirable means may, of course, be employed, if preferred, for connecting the tool holder operatively with the driving member 13.

Means are provided on the driven portion 12 of the tool holder for receiving and releasably operatively retaining the tool 10. For this purpose, the portion 12 comprises a body 28 located within the cavity provided by the member 11 and from which body the shank 15 extends centrally through a central opening in the end or head wall 27, an annular shoulder 30 about the base of the shank 15 supportingly confronting the inner side of the head wall 27 in relatively rotatable slidable relation. For receiving the shank of the tool 10, the body 28 is provided with an axially outwardly opening bore 31 coaxial with the shank 15 and opening from the opposite end of the body. In its inner end portion, the bore is of reduced diameter and has a square cross section area 32 of substantial length adapted to receive telescopically therein the square drive end (not shown) of the tool 10. Means enabling mounting of the tool 10 and retention of the tool against unintentional withdrawal from the recess or bore 31 comprise a retaining device in the form of a bushing member 33 which is longitudinally slidably received in the bore 31 and has a central bore 34 therethrough within which the cylindrical body portion of the tool 10 is received. Normally the bushing 33 is biased by means of a coiled compression spring 35 axially outwardly relative to the bore 31 but is held to a limited outward displacement by means comprising a plurality of circumferentially spaced and aligned ball members 37 (FIGS. 3 and 4) mounted freely rotatably in respective sockets 38 in the wall of the inner end portion of the bushing and confined to a limited radially inward projection into the bushing bore 34 as by a reduced diameter respective annular seat 39 about the inner end of each of the socket holes 38. The balls 37 are of larger diameter than the thickness of the wall of the bushing 33 so that at all times the balls will project, even when seated on their seats 39, radially outwardly relative to the bushing ball and thus engage a frustoconical axially inwardly and outwardly oblique cam surface 40 which leads from an intermediate enlargement 41 of the holder body bore 31. Thus, under the bias of the spring 35, the bushing 33 can project outwardly only to the extent permitted by the balls 37 riding on the cam surface 40. Assembly of the balls 37 into their sockets is adapted to be effected by inserting them successively through an assembly opening 42 provided for this purpose radially through the wall of the body 28 in alignment with the bore enlargement 41 and while the ball sockets 38 are aligned with the assembly opening. Proper location of the bushing 33 in the bore 31 to effect such ball assembly may be gauged by pressing the inner end of the bushing against a stepped shoulder 43 facing axially outwardly at a proper position axially inwardly from the enlargement 41. After assembly of the balls, the opening 42 may be plugged, if desired.

Upon insertion of the shank end of the tool 10 into the bushing 34, the reduced diameter terminal portion of the shank will of course pass freely through the bushing, and when the cylindrical body portion of the tool, which is about the same diameter as the bushing bore 34, reaches the retainer balls 37, the balls are caused to roll inwardly along the widening cam surface 40, correspondingly moving the bushing 33 axially inwardly and compressively increasing the load or thrust exerted by the spring 35, until the balls sufficiently clear into the sockets 38 to pass the tool shank into complete axial assembly within the holder. Thereupon, the balls 37 are caused by the spring bias axially outwardly on the bushing 33 to ride along the cam surface 40 to thrust radially inwardly into gripping engagement with the tool shank, axially outward pulling force on the tool shank acting to increase the retaining thrust against axial outward displacement of the tool, thus firmly, but nevertheless releasably retaining the tool. Release of the tool is easily effected by pressing inwardly on the outer end of the bushing 33, substantially as shown in FIG. 4, until the balls 37 release the tool shank which may then drop out of or be withdrawn from the tool socket, including the bushing. To facilitate such inward pressing of the bushing 33, its outer end is desirable provided with a lateral annular flange 44.

Means are provided for normally coupling the member 11 and the tool holder body 28 corotatively but with an overload torque-sensitive release capability. For this purpose, torque-sensitive clutch mechanism desirably comprising sets of clutch rollers 45 (FIGS. 2 and 3) each including a pair of the rollers are disposed in balanced relationship at diametrically opposite sides of the tool holder assembly. Normally the respective pairs of clutch rollers 45 are biased apart by means of compressed compression springs 46 which thereby thrust the rollers into clutching engagement with the inner cylindrical surface of an axial wall flange 47 of the driving member 11 and the ends of respective cam surfaces 48 comprising parallel flats 48 on a sleeve 49 concentric with the body 28 and of substantially smaller diameter than the inner surface of the wall flange 47 so as to be in concentric gap relation thereto. Normally the sleeve 49 is coupled frictionally with the body 28 through a sleeve 50 telescopically engaged within the sleeve 49 and coupled therewith by means of a key 51 engaged fixedly in a keyway 52 in the sleeve 50 and extending into a slightly wider keyway 53 in the confronting inner surface of the sleeve 49. The coupled sleeves 49 and 50 are mounted concentrically relative to the body 28 in a manner to be relatively rotatable about the cylindrical portion of the body 28 which extends slidably in telescoped relation through the inner sleeve 50.

Means are provided for normally frictionally maintaining a corotational relationship of the sleeve assembly with the body 28 so that in the normal operating interengagement of the clutch rollers 45 with the ball flange 47 and the surfaces 48 will result in rotary driving of the tool 10 when the body 28 is rotatably driven through the roller clutch mechanism by rotary driving of the member 11 by the driving spindle. To this end, the inner sleeve 50 is desirably slightly longer than the outer of the sleeves 49 and is engaged at its axially outer end by biasing means which thrusts the sleeve 50 axially inwardly so that an inner annular end face 54 of the sleeve thrusts in frictional slip clutch engagement with a confronting annular slip clutch end face surface 55 on the body 28 and provided by an annular radially outwardly extending flange 57 on the body providing the shoulder 30 on its axially outer face. In a desirable form the friction clutch biasing means comprise at least one conical spring washer 58, also identifyable as a Belleville spring, which thrusts against the axially outer end of the sleeve 50 and is maintained under predetermined compressive load by a ring nut 59 threaded onto the outer end portion of the body 28. By means of the nut 59, biasing force of the spring 59 can be adjusted to obtain optimum friction clutch results for the particular tool application for which the chuck or tool holder is intended. For protectively enclosing the mechanism within the housing provided by the member 11, an annular end closure or cover 60 may be affixed to the free end of the wall flange 47 removably or permanently, as preferred. While the cover 60 may be joined to the flange 47 by threadedly engaging the same thereon, it may be press-fitted or bonded thereto by means of a suitable adhesive.

In operation of the tool chuck or holder, the tool 10 may be driven rotatably in either rotary direction as preferred, for example to tap a right hand thread or to tap a left hand thread, or the tool may be held stationary while the workpiece is rotated relative to the tool in order to attain the desired results from operation of the tool on the workpiece. Of course, for very high speed operation both the tool and the workpiece may be relatively rotated. Whichever way is preferred, the portions 11 and 12 of the holder will be clutched for corotation by the cooperating clutch mechanisms comprising the clutch roller 45 and the friction clutch. However, when a torque relationship between the tool 10 and the body 28 with which it is interlocked and the member 11 develops which is greater than the predetermined maximum for which the friction clutch is set or adjusted, the friction clutch slips permitting relative rotation of the members 11 and 28 and then torque sensitive release means function to declutch the rollers 45 so that the portions 11 and 12 of the holder may freely rotate relative to one another, thereby relieving the holder mechanism from torque strain. To this end, when the slip clutch surfaces 54 and 55 slide relatively in response to the torque overload, respective clutch roller releasing trippers 61 (FIGS. 2 and 5-7) functionally integral with the body 28 operate to urge the clutchingly driving roller 45 in each set from its wedging driving seated relation to the associated cam 48, as shown in FIG. 5 so that from there on the members 11 and 28 are free to rotate relatively with substantially complete release of torque resistance. In an efficient, positively operating structure, the trippers 61 comprise respective generally circumferentially facing and respective clutch roller opposing tripping shoulders provided by opposite edges of roller clutch clearance cutouts or notches 62 at diametrically opposite points in an axially extending flange 63 extending from the shoulder flange 57 into the gap between the wall flange 47 and the clutch sleeve 49. Thus, the respective tripping shoulders 61 automatically move into releasing engagement with the confronting clutch rollers within either of the members 11 and 28 is caused to move rotatably relative to the other of such members due to torque overload. While in FIG. 5 the situation demonstrated is that wherein the member 11 is rotating clockwise, considered from the viewpoint of FIG. 1, and the member 28 is either held stationary or rotating counterclockwise, if the reverse relative torsional displacement of the members were to be in effect, the opposite one of the tripping shoulders 61 would be operative to release its associated clutch roller 45.

Resetting of the roller clutch mechanism for corotational driving of the holder members is effected by reverse relative slipping of the friction clutch to return the tripping shoulders 61 to neutral position relative to the clutch roller 45. This normally occurs by reversing the drive of either the holder, or the workpiece, or both to back the tool, namely the tap 10, out of the hole in the workpiece after an overload torque condition has caused declutching. During such reversal, initial resistance of the tool to the reversal results in slight relative reversed shifting at the slip clutch surfaces 54 and 55 so that there is, in effect, a resetting angular movement of the trip shoulder flange 63 relative to the member 11 whereby the declutchingly active trip shoulders 61 are backed away from and release the associated clutch rollers 45 for clutching operation in the next operating cycle of the apparatus. Should the back-out resistance be too great, so as to be in excess of the predetermined torque load for which the holder has been adjusted, the opposite tripping shoulders 61 will become effective to release the roller clutch.

During the backing out of the tool, and especially in situations where the initial resistance of the tap 10 may not be enough during a turn-out movement of the tool holder or of the workpiece to insure sufficient relative torsional motion for complete restoration of the roller clutch, assistance toward the relative resetting is afforded by the lost motion connection provided by the keyway 53 which is wider than the key 51 so that a limited range of relative torsional movement of the sleeves 49 and 50 is permitted as demonstrated on comparison of FIGS. 5 and 6, wherein FIG. 6 demonstrates a relative resetting torsional movement between the parts of the holder. In other words, at the initial back-out movement, the clutch roller 45 opposite from that clutch roller which has been tripped by the overload release functions to move the sleeve 49 torsionally relative to the sleeve 50 to the extent permitted by the lost motion connection, to thereby return the cam surfaces 48 to a neutral position relative to the tripping shoulders 61 as shown in FIG. 6, compared to the declutching relative position shown in FIG. 5.

While the tripping shoulder flange 63 may be formed integral in one piece with the body flange 57, as shown in FIG. 3, a two piece arrangement may be employed as shown in FIG. 7 wherein the flange 57 and the flange 63 are connected in suitable manner such as press-fit, threaded, bonded, or the like at a joint 64, with means such as a pin 65 desirably augmenting the joint.

I claim as my invention:

1. In apparatus comprising complementary portions in concentric relatively rotatable assembly but which must corotate operatively:
   one of said portions having a cylindrical area;
   the other of said portions have an annular part including a pair of diametrically opposite cam areas in spaced confronting relation to said cylindrical area;
   one-way clutch rollers normally biased into releasable clutching interengagement with said confronting areas whereby normally to hold said portions against relative rotary movement;
   torque-sensitive overload release means comprising a torque-releasable connection between said portions normally operative to maintain them against relative rotation but releasable in response to predetermined torque overload to permit relative rotation; and
   means carried by said other of said portions between said part and said cylindrical area and operative during torque overload release relative rotation of said portions to push against and trip said rollers in opposition to their bias and into released relation to said cam areas.

2. Apparatus according to claim 1, said last-mentioned means comprising circumferentially spaced tripping shoulders normally located in neutral relation to the clutch rollers.

3. Apparatus according to claim 1, said torque-sensitive means including a friction clutch connecting said annular part with said other of said portions.

4. Apparatus according to claim 1, said other of said portions comprising a body member which is relatively rotatable with respect to said one portion, said annular part being a sleeve member having thereon said cam areas, and said torque sensitive means including a friction clutch coupling between said sleeve member and said body member.

5. Apparatus according to claim 1, in which said clutch rollers comprise a pair of rollers in association with each of said cam areas, and biasing spring means normally thrusting said rollers apart and into one-way respective clutching interengagement in respect to the cam areas and the cylindrical area.

6. Apparatus according to claim 5, said tripping means comprising respective circumferentially facing tripping shoulders on said other of said portions normally neutral with respect to the rollers but operative in either respective direction of relative rotary movement of said portions to release the clutching engagement of the respective rollers relative to said cam surfaces to permit free relative rotary movement of said portions.

7. In apparatus comprising complementary portions in concentric relatively rotatable assembly but which must corotate operatively:
   an annular radially inwardly facing area on one of said portions;
   a member comprising part of the other of said portions having a plurality of cam surfaces confronting said annular area;
   respective circumferentially spaced one-way pairs of circumferentially spaced clutch rollers interengaging with said annular area and said cam surfaces with the rollers of each pair in respective alternately oppositely operable clutching relation; and
   torque-sensitive overload release means including trippers operable to thrust in one circumferential direction to release on of the rollers of each pair for overload release during rotary movement in one direction and trippers operable to thrust in the opposite circumferential direction to release the other of said pair of rollers in each instance for overload release during rotary movement in the opposite direction.

8. Apparatus according to claim 7, said trippers comprising releasing shoulders located at the respective opposite sides of said pairs of rollers and movable toward and into declutching engagement with the respective rollers to effect said overload release.

9. In apparatus comprising complementary portions in concentric relatively rotatable assembly but which must corotate operatively:
   respective annular oppositely radially facing areas of said portions being in spaced confronting relation;
   said area which faces radially outwardly having diametrically opposite roller clutch cam surfaces;
   clutch rollers at said surfaces including means for biasing the rollers normally into one-way clutching interengagement with said surfaces and the radially inwardly facing area; and
   torque-sensitive means for releasing said rollers in response to torque overload including tripper means operative to push the rollers from said clutching interengagement, and including a limited lost motion connection between one of said areas and its portion of apparatus enabling relative torque resistance rotary movement therebetween to facilitate backing off of said tripper means relative to the rollers to return the rollers to the clutching interengagement.

10. Apparatus according to claim 9, said radially outwardly facing area comprising an annular coupling member, said surfaces comprising generally chordal flats on said coupling member, said rollers engaging an end of the respective flats, said tripper means being operative during torque overload declutching to move said rollers inwardly from said ends, a second annular coupling member telescopically within the first-mentioned annular coupling member, and said lost motion connection comprising a key corotatively fixed to one of said coupling members and extending into a keyway in the other of said coupling members and of greater circumferentially extending width than the portion of the key extending thereto.

11. A tool holder comprising:
   a generally cup-shaped member open at one end and having a wall at its opposite end with a central aperture;
   a tool-holding body housed within said member and having a shank extending through said aperture;
   torque overload release means normally corotatively connecting said body and member;
   means on said shank for relatively rotatably connecting it to a supporting member for supporting both the body and the cup-shaped member as an assembly therefrom; and
   means on said end wall for coupling said cup-shaped member with said supporting member against relative rotation.

12. A tool holder according to claim 11, in which said means for coupling said cup-shaped member with said supporting member comprises a coupling lug on said end wall.

13. A tool holder of the character described, comprising:
   a body having a bore opening from one end thereof adapted to receive a tool shank in endwise relative assembly;

means within an inner end portion of said bore for free endwise reception and release of the tool shank but operative to lock the tool shank against rotation thereof relative to the body;

a bushing relatively reciprocably mounted in said bore and of an inside diameter dimensioned to receive the tool shank freely therethrough;

means normally biasing said bushing axially outwardly relative to said bore;

clutch means comprising generally radially movable clutch balls carried in radial socket holes in said bushing;

oblique cam surface areas in the body bore engageable by said clutch balls for driving them inwardly relative to the bushing for tool shank clutching in the outwardly biased condition of the bushing and permitting the balls to move radially outwardly into declutching relation upon axially inward movement of the bushing;

said body having a radial assembly opening located axially inwardly relative to said cam surface areas; and a shoulder facing axially outwardly in proper position axially inwardly relative to said assembly opening and engageable by the inner end of said bushing upon pushing it in opposition to said biasing means until said inner end engages the shoulder and said socket holes are aligned with said opening to receive the balls in assembling them with the bushing.

* * * * *